US007798691B2

(12) United States Patent
Peters et al.

(10) Patent No.: US 7,798,691 B2
(45) Date of Patent: Sep. 21, 2010

(54) LIGHTING DEVICE AND METHOD FOR DIRECTING LIGHT

(75) Inventors: Ralph Hubert Peters, Maastricht (NL); Marc Andre De Samberg, Lommel (BE); Koen Van Os, Eindhoven (NL); Norbertus Antonius Maria Sweegers, Lierop (NL); Egbert Lenderink, Waalre (NL); Johannes Antonius Adrianus Maria Van Heeswijk, Son (NL); Johann-Josef Kohl, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 133 days.

(21) Appl. No.: 12/093,607

(22) PCT Filed: Nov. 9, 2006

(86) PCT No.: PCT/IB2006/054175

§ 371 (c)(1),
(2), (4) Date: May 14, 2008

(87) PCT Pub. No.: WO2007/057818

PCT Pub. Date: May 24, 2007

(65) Prior Publication Data

US 2008/0316764 A1 Dec. 25, 2008

(30) Foreign Application Priority Data

Nov. 17, 2005 (EP) ................................ 05110906

(51) Int. Cl.
*F21V 7/00* (2006.01)
*B60Q 1/04* (2006.01)

(52) U.S. Cl. ...................... 362/545; 362/294; 362/298; 362/547

(58) Field of Classification Search ................ 362/545, 362/547, 516, 298, 294, 373
See application file for complete search history.

(56) References Cited

U.S. PATENT DOCUMENTS

| | | | | |
|---|---|---|---|---|
| 5,136,483 | A * | 8/1992 | Schoniger et al. | 362/545 |
| 6,945,672 | B2 * | 9/2005 | Du et al. | 362/241 |
| 7,128,454 | B2 * | 10/2006 | Kim et al. | 362/507 |
| 7,357,546 | B2 * | 4/2008 | Ishida et al. | 362/545 |
| 7,455,438 | B2 * | 11/2008 | Repetto et al. | 362/516 |
| 7,585,096 | B2 * | 9/2009 | Fallahi et al. | 362/517 |

(Continued)

FOREIGN PATENT DOCUMENTS

EP 1434002 A2 6/2004

(Continued)

*Primary Examiner*—Stephen F. Husar
*Assistant Examiner*—Peggy A. Neils

(57) ABSTRACT

An LED module is described with a base 10 made out of a heat conducting material. An LED element (32) is arranged in a cavity (11) of the base. A collimator reflector (70) is formed by reflective surfaces (24, 64, 66*a*). Three of these reflective surfaces (66*a*, 66*b*, 64) are provided on a plastic insert (60) received in the cavity (11). A further reflective surface (24) is provided on the base (10) itself. This surface (24) has a straight border line (50). The collimator reflector (70) is arranged to reflect light from the LED (32) so that a cut-off (72) is formed by the straight border line (50). By thus integrating the cut-off, as the most critical optical element, into the base (10) itself, high accuracy is achieved.

10 Claims, 9 Drawing Sheets

U.S. PATENT DOCUMENTS

| | | | |
|---|---|---|---|
| 2004/0208018 | A1 | 10/2004 | Sayers et al. |
| 2005/0057917 | A1 | 3/2005 | Yatsuda et al. |
| 2005/0219856 | A1 | 10/2005 | Tatsukawa |

FOREIGN PATENT DOCUMENTS

| | | | |
|---|---|---|---|
| EP | 1447617 | A2 | 8/2004 |
| EP | 1672272 | A2 | 6/2006 |
| EP | 1770793 | A2 | 4/2007 |
| WO | WO2004088201 | A1 | 10/2004 |
| WO | WO2005028250 | A1 | 3/2005 |
| WO | WO2006012842 | A2 | 2/2006 |

* cited by examiner

FIG. 1
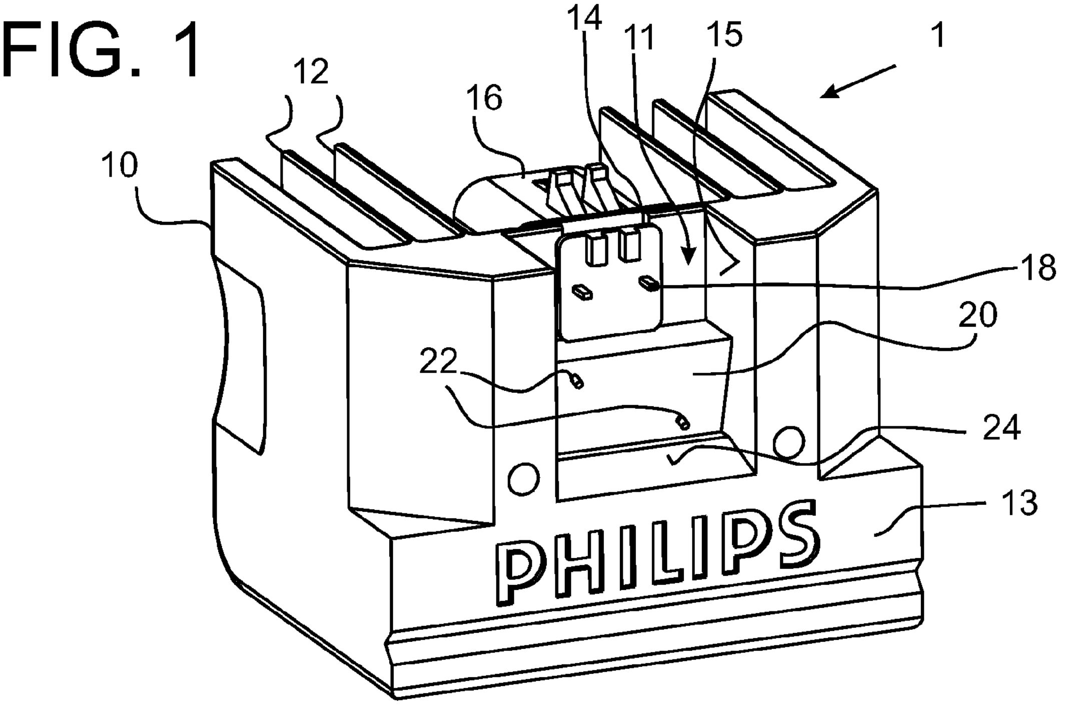
FIG. 1a
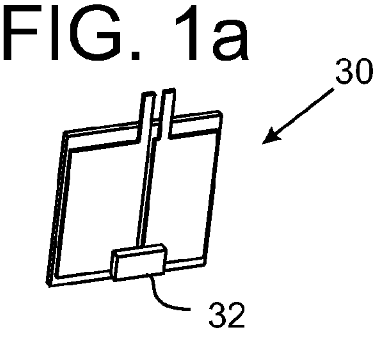
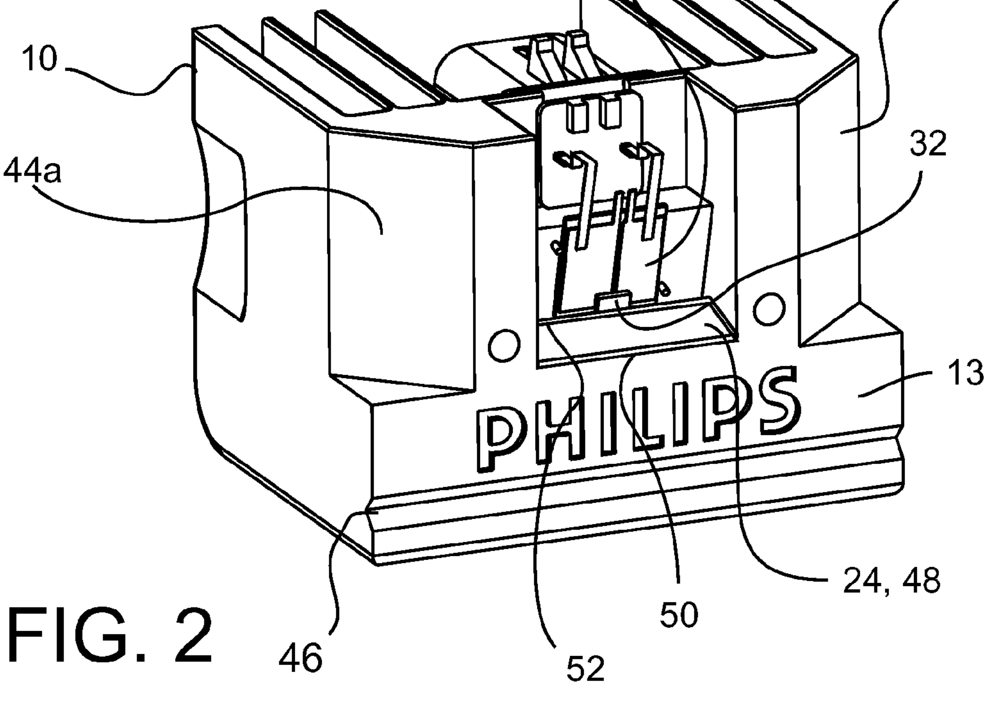
FIG. 2

FIG. 4
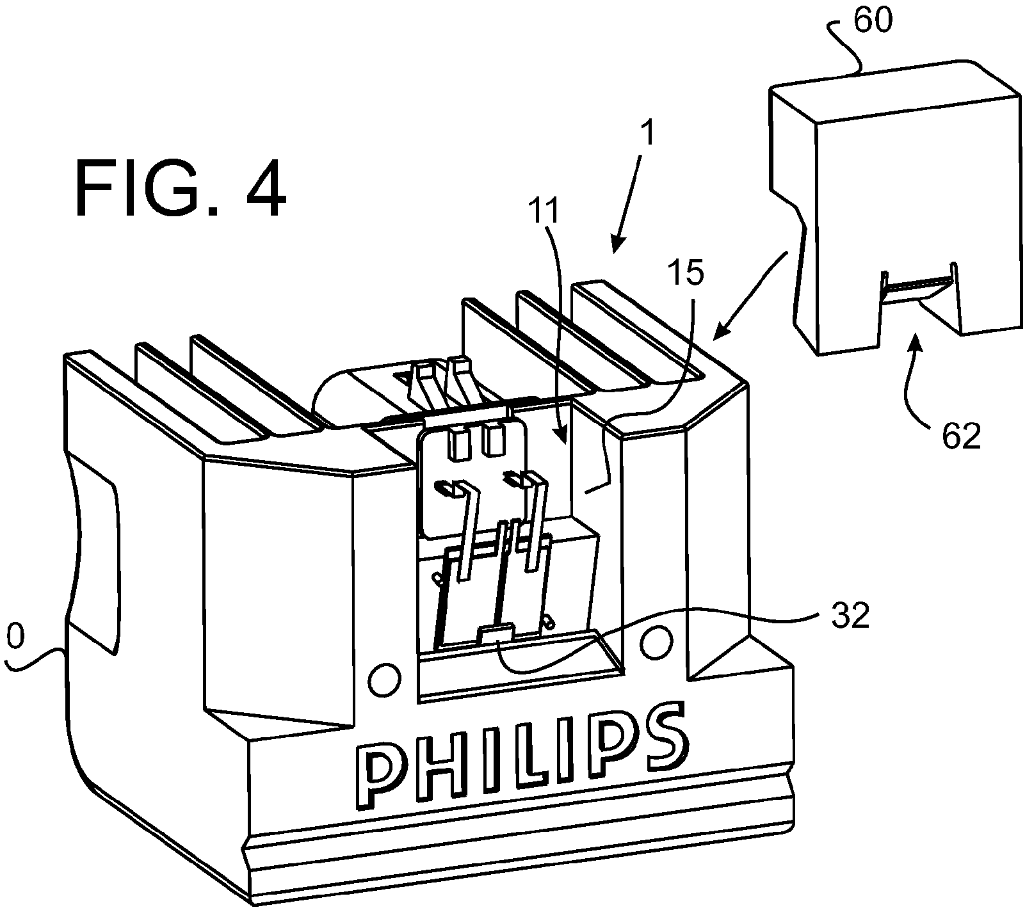
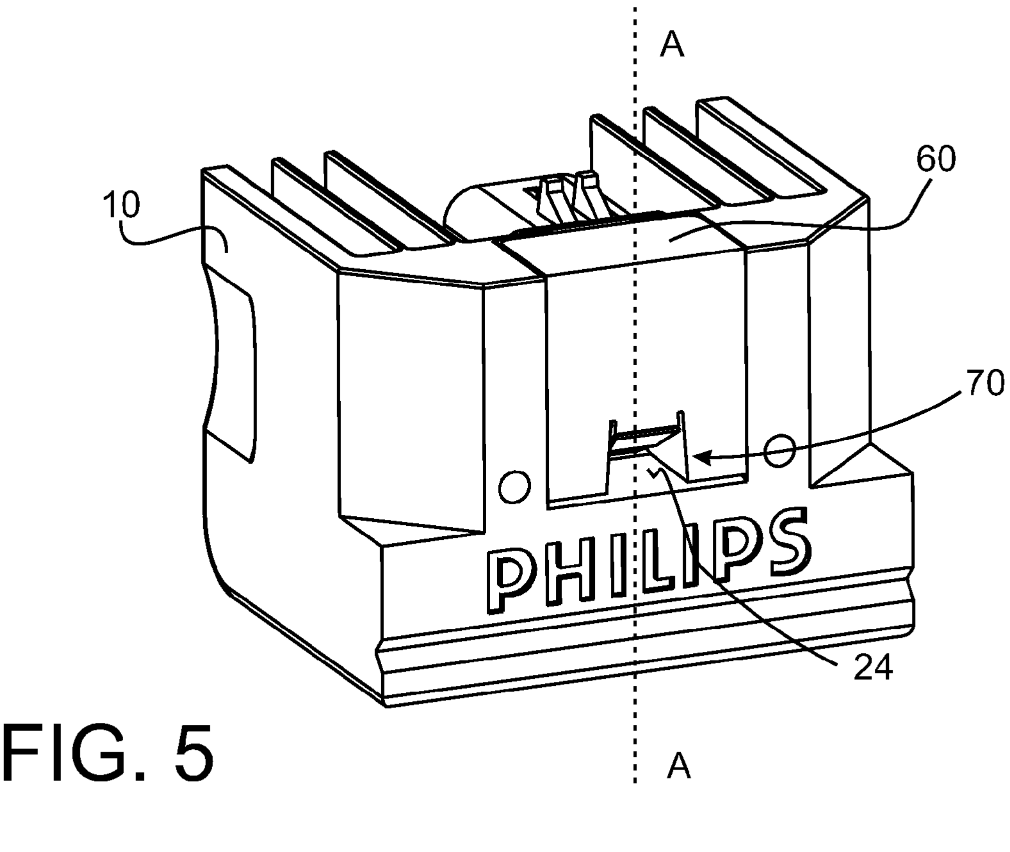
FIG. 5

FIG. 6
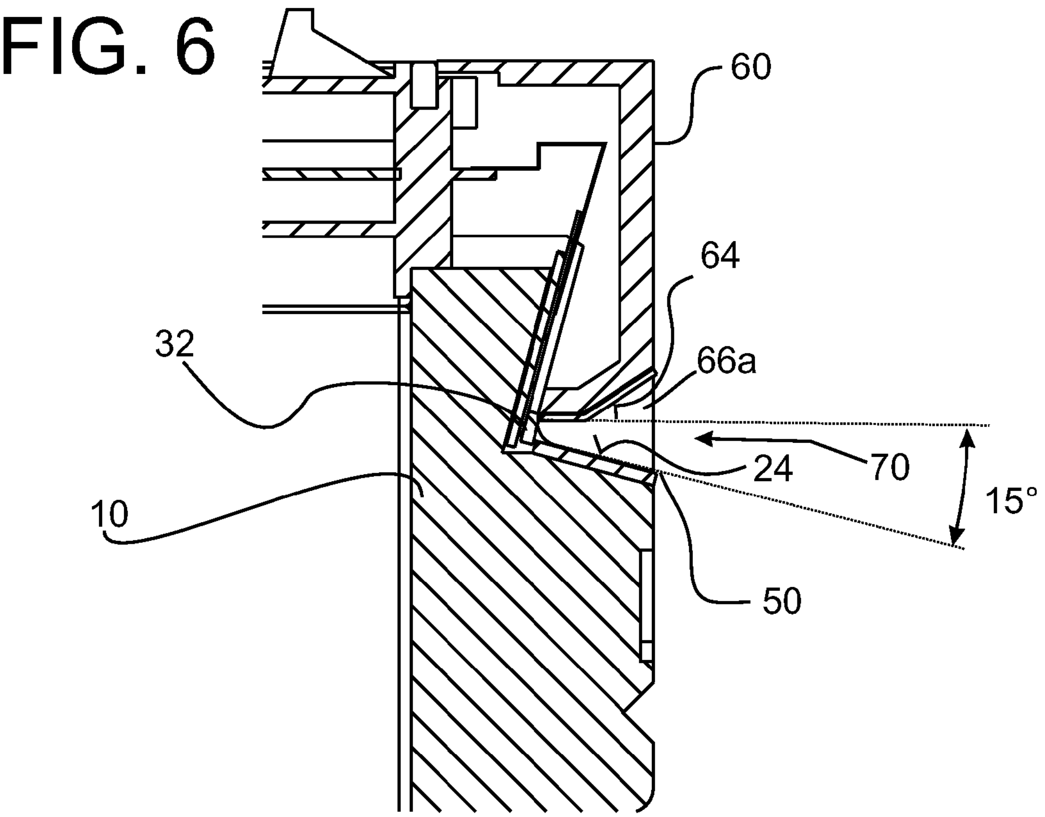
FIG. 7
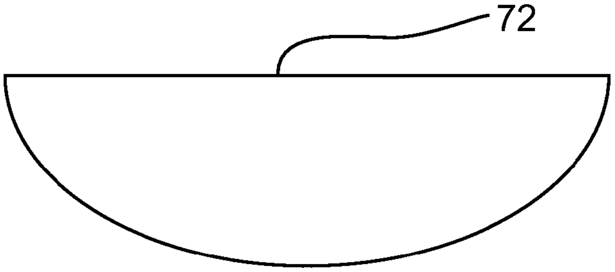
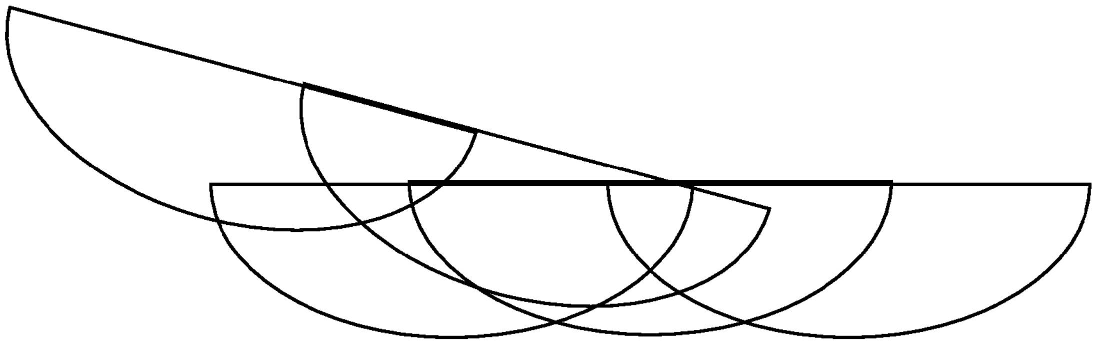
FIG. 8

FIG. 12a
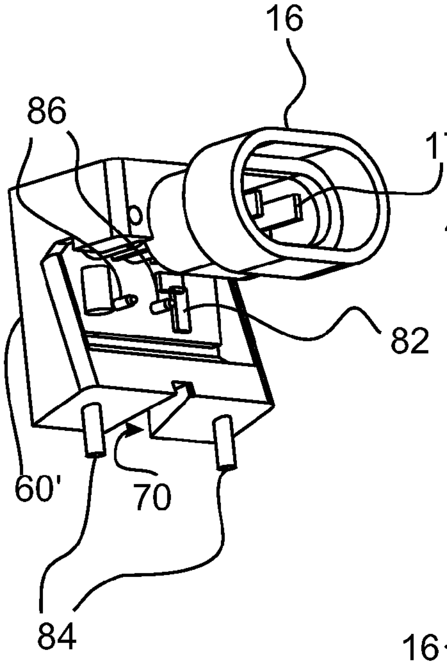
FIG. 12b
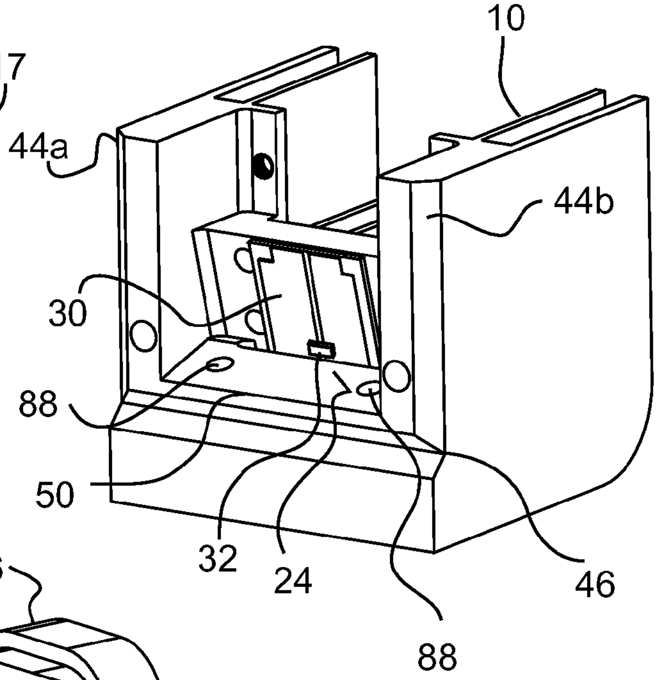
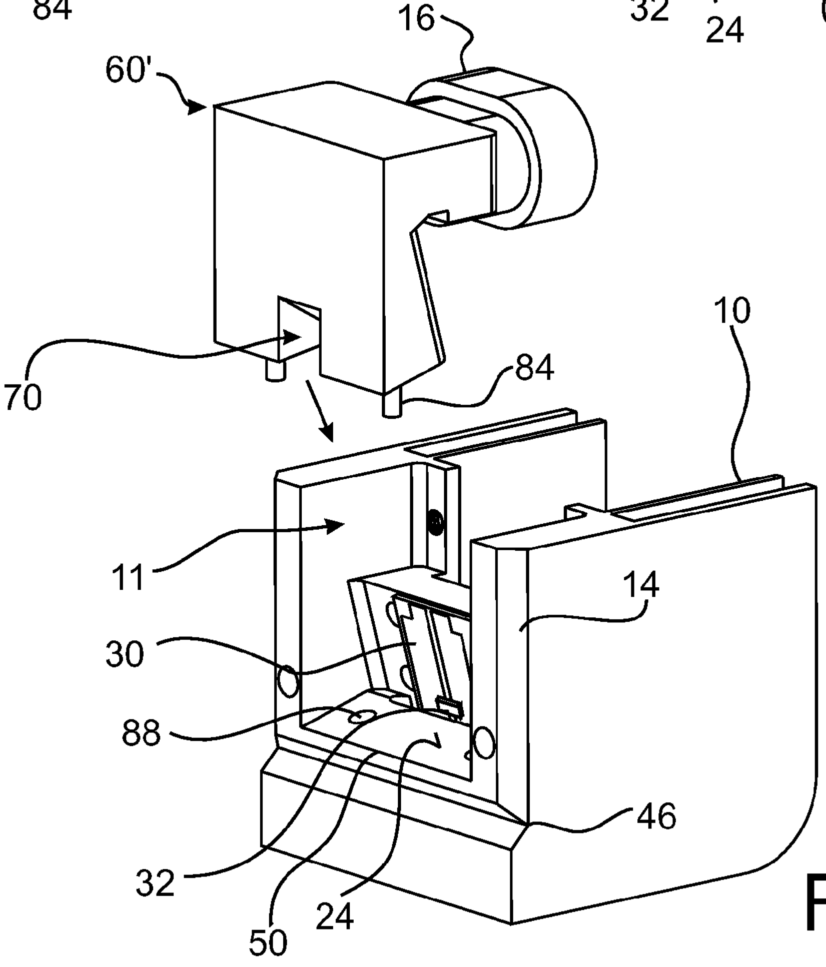
FIG. 13

LIGHTING DEVICE AND METHOD FOR DIRECTING LIGHT

The invention relates to a lighting device, a vehicle headlight and a method for directing light emitted from an LED lighting element.

LED lighting technology has become applicable in many areas. Especially in automotive lighting, headlamps using LED lighting elements are now proposed. For automotive front lighting, it is essential to achieve a desired light distribution, including a clear cut-off.

US-A-2005/0057917 discloses a vehicle lamp using an LED light source. The light source includes a base formed as a heat radiating core. In a cavity of the base, an LED chip is mounted. An optical member is disposed above the base, which includes a light shielding portion for forming a cutoff suited for a light distribution pattern for a vehicle headlight. The inner surface of the light shielding portion may be formed as a first reflection surface, and the inner surface of the base cavity may include a second reflection surface facing the first surface.

In prior art vehicle headlights and lighting devices it has been a problem that the element forming the cut-off, e.g. in US-A-2005/0057917 the light shielding portion, needs to be arranged quite accurately. Thus, arrangement of the light shielding portion on the base needs to be done with very low tolerance, leading to a complicated and costly production process which often involves a subsequent adjustment procedure.

It is an object of the present invention to provide a lighting device, a vehicle headlight and a method for directing light emitted from an LED lighting element, where improved accuracy of the cut-off positioning is achieved.

This object is solved by a lighting device according to claim 1, a vehicle headlight according to claim 9, a method according to claim 10, and a lighting device according to claim 11. Dependent claims refer to preferred embodiments of the invention.

According to the invention, the lighting device comprises a base made out of a heat conducting material and an LED lighting element arranged at the base. Preferably, the base is made out of a metal material, such as aluminum. In this way, the base can serve as a heat sink for heat generated in the LED lighting element.

In order to direct the light emitted from the LED element, a collimator reflector is provided, which may comprise a plurality of reflective surfaces. At least a first reflective surface is present, which has at least one straight border line. The first reflective surface is arranged so that it reflects light from the LED element. A cut-off, i.e. a line which delimits an area of good illumination from an area of little or no illumination in the light distribution achieved by the collimator reflector, is formed by the border line. Therefore, it is preferred that the straight border of the reflective surface is arranged at the distant end of the reflective surface with regard to the LED element.

According to the invention, the reflective surface including the border line which generates the cut-off is a surface of the base. The straight border line is preferably an edge arranged at the base. In contrast to prior art solutions, where the cut-off element is a separate body, and is in some way fastened to the base, here a part of the base itself serves as cut-off element. This eliminates tolerances occurring in the mounting of the cut-off element. This is especially advantageous, since the part forming the cut-off is the most critical optical element. The relative positioning of the LED element, which is mounted on the base, and the reflective surface, which is a part of the base must be quite accurate.

As a further advantage, a lighting device according to the invention is easy to produce. Part count is exceptionally low. Still, the lighting device has a well-defined interface in terms of mechanical (mounting of the base), thermal (heat conductive base) and optical (cut-off) behavior.

In a preferred embodiment, the first reflective surface is a planar surface. One border line, referred here to as the second border line, is arranged closer to the LED lighting element. The border line at the opposite end of the planar surface, which is the straight border line used to generate the cut-off, is arranged for the distant end, spaced apart from the LED lighting element. Such a reflection surface may form part of a horn-shaped asymmetrical collimator. A flat surface can easily be produced with high accuracy.

According to a further preferred embodiment, the base comprises at least one mechanical reference element. A mechanical reference element serves to provide an external reference for positioning of the base through mechanical contact. There are various shapes which can be used as a mechanical reference, including flat surfaces, grooves, pins, bores, webs or other cavities or elevations. The at least one mechanical reference element is provided in predetermined relation to the border line. Such a mechanical reference element serves to achieve exact mounting of the base in a vehicle headlight. A vehicle headlight body may comprise one or more headlight reference elements with a shape corresponding to the mechanical reference element of the lighting device to allow the headlight reference element to engage the mechanical reference element. In this way, an exact mounting of the base in the vehicle headlight is achieved, which in turn also provides an exact light distribution, because the cut-off, as the most critical part of the light distribution, is formed by a part of the base itself. In this way, the tolerance chain from the mechanical reference elements in the headlight to the cut-off element is considerably shortened with regard to prior art solutions. In a further preferred embodiment, at least one mechanical reference element is arranged in a line which runs in parallel to the border line generating the cut-off. This makes it especially convenient to achieve exact alignment of the cut-off with regard to the vehicle headlight.

In a particularly preferred embodiment, the base comprises a cavity, in which the LED lighting element is mounted. An insert is inserted into the cavity, such that it is at least partly received therein. The insert comprises at least one, preferably all remaining reflective surfaces of the collimator reflector. These reflection surfaces are preferably provided with a reflective coating. The insert can easily be positioned by inserting it into the cavity, where it preferably fits between the walls or other elements defining the cavity, so that good mechanical fixture and exact positioning are assured even without further adjustment. Also, mounting the LED element in a cavity of a metal base may be advantageous in terms of electromagnetic compatibility (EMC).

Preferably, the insert is made of plastic material and may be formed by injection molding. To further enhance the EMC properties, the material may be chosen to shield the LED element and electrical leads connected to it. In a further embodiment of the invention, there are electrical contacts molded into the plastic material that forms the insert. These electrical contacts are electrically connected to the LED lighting element, thereby providing connection from said LED lighting element to a power supply. This embodiment simplifies the construction of the lighting device, which may entirely consist of no more than the base (with first reflective surface), the LED, the insert (with further reflective surfaces and electrical contacts) as well as, optionally, a connector. The connector may even be integrated with the insert. This leads to extremely simple construction, low part count and cost-efficient yet very exact production.

In a further preferred embodiment, an electrical circuit is connected to the electrical contacts of the insert. The electrical circuit may be molded in, or otherwise mounted on the insert. The electrical circuit may perform the function of an LED driver, so that all that is needed to operate the lighting device would be to apply the operating voltage, e.g. car battery voltage in the case of automotive lighting.

The above-described embodiments of a lighting device with an insert comprising electrical contacts molded into the plastic material are also advantageous separately from the solution according to claim 1, and are therefore regarded as a separate invention. In a lighting device according to claim 11, an insert is at least partly received in the cavity of the base. The insert comprises at least one reflective surface of the collimator reflector. The insert is made of plastic material. Contacts are molded into the plastic material. It is possible that the insert comprises an integrally formed electrical connector (e.g. plug), and that the contacts are electrically connected to the plug.

In a vehicle headlight according to claim 9, a lighting device as explained above is mounted in a vehicle headlight body. The vehicle headlight body comprises one or more headlight reference elements to engage the one or more mechanical reference elements provided on the lighting device. In this way, exact mounting is ensured.

These and other aspects of the invention will be apparent from and elucidated with reference to the embodiments described hereinafter. These embodiments will be described with reference to the figures, in which:

FIG. 1 shows a perspective view of a base part of a first embodiment of a lighting device;

FIG. 1*a* shows a perspective view of an LED element of the first embodiment;

FIG. 2 shows a perspective view of the base part of FIG. 1 with the LED element of FIG. 1*a;*

FIG. 3*a*-3*c* show perspective views of different production stages of the LED element of FIG. 1*a;*

FIG. 4 shows a perspective, partially exploded view of the first embodiment of a lighting device with the base part from FIG. 1 and an insert;

FIG. 5 shows a perspective, assembled view of the lighting device of FIG. 4;

FIG. 6 shows a cross-sectional view of the base part of FIG. 5 with a section along the line A . . . A;

FIG. 7 shows in diagram form a simplified projection image of the light distribution achieved with the lighting device from FIG. 5;

FIG. 8 shows in diagram form a simplified image of a light distribution achieved with a plurality of lighting devices of FIG. 5;

Figure 14A:
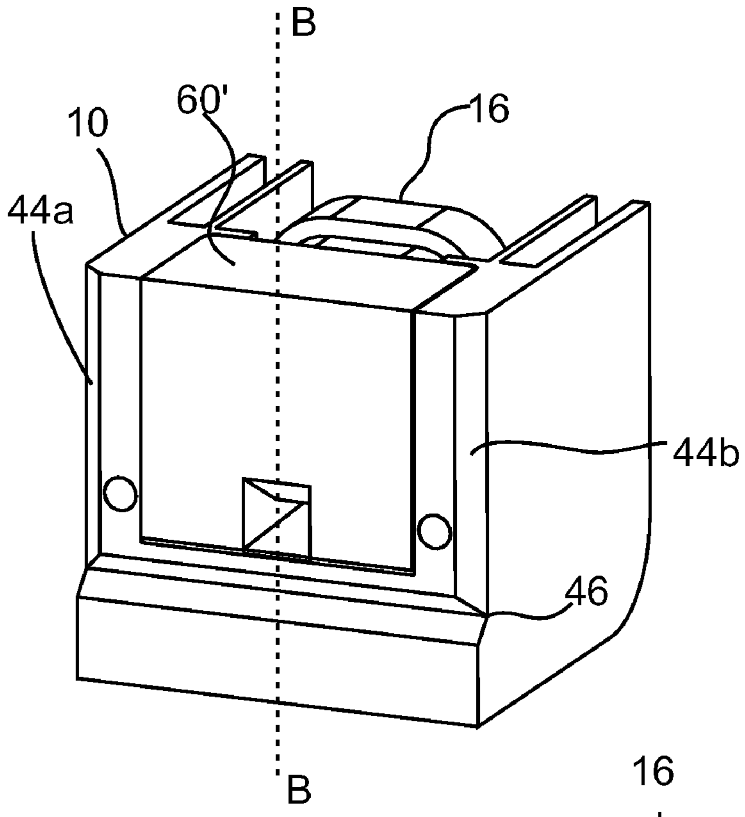
Figure 14B:
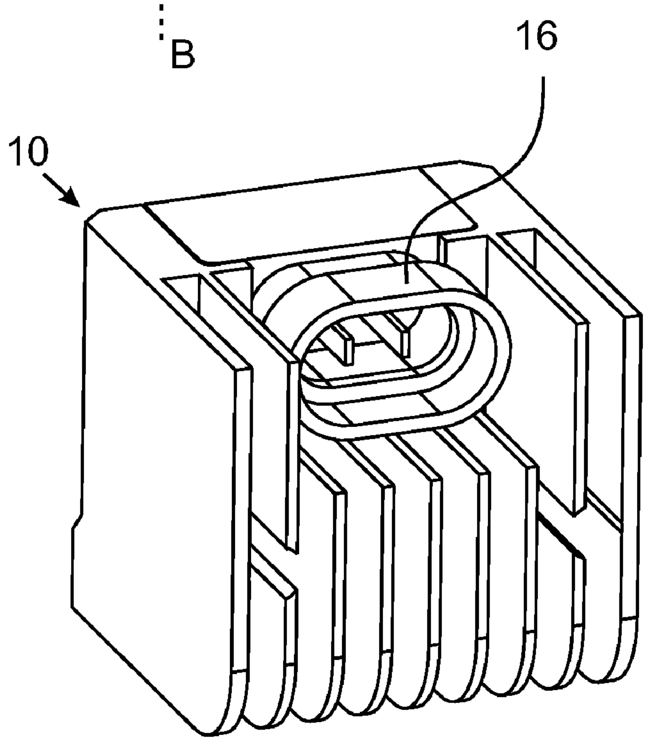
Figure 15A:
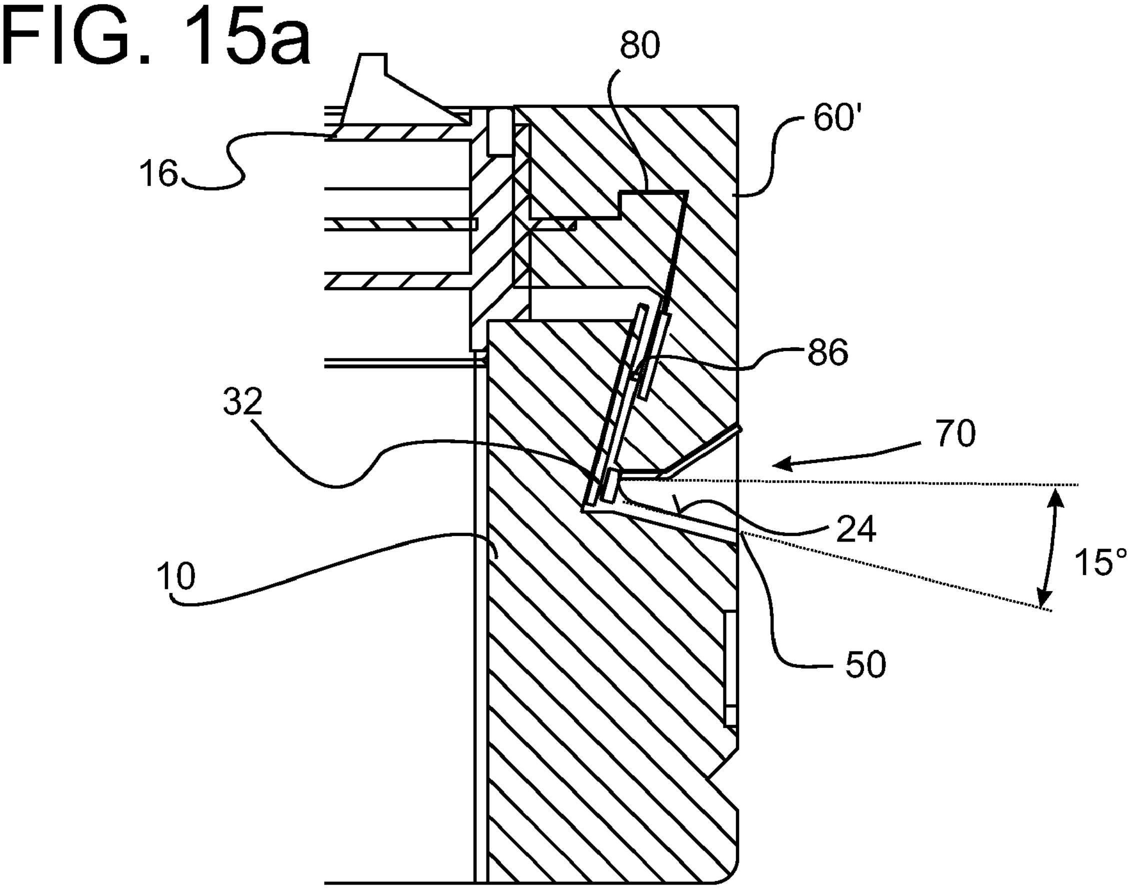

FIG. 9*a*, 9*b*, 10*a*, 10*b*, 11*a*, 11*b* show the mounting of a lighting device of FIG. 5 in a vehicle headlight;

FIG. 12*a* shows a perspective view of an insert according to a second embodiment of the invention;

FIG. 12*b* shows a perspective view of a base according to a second embodiment of the invention;

FIG. 13 shows a perspective, exploded view of lighting device according to a second embodiment of the invention;

FIG. 14*a*, 14*b* show perspective views of a lighting device according to the second embodiment;

FIG. 15*a* shows a cross-sectional view of the assembled lighting device of FIG. 14*a* according to a first variant with the section taken along line B . . . B in FIG. 14*a*.

FIG. 15 *b* shows a cross-sectional view of FIG. 14*a* according to a second variant with the section taken along line B . . . B in FIG. 14*a*

FIG. 1 shows a base part 10 of a lighting device 1, here also referred to as an LED module 1. The base part 10 is made of aluminum. The base has the function of a heat sink. It is equipped with a heat radiating structure, including cooling fins 12. On the top part of the base 10, a cut-out 14 is formed where a connector part 16 is received. The connector 16 is a plastic part including a plug (on the back side of the connector part 16; not shown in FIG. 1) and two contacts 18 electrically connected to the plug.

The base 10 comprises a cavity 11 provided in its front surface 13, which is bordered by side walls 15. At the bottom of the cavity 11, there is a mounting surface 20 with two protruding alignment pins 22. Arranged next to the mounting surface 20 there is surface 24 which serves a reflector surface.

Figure 3A:
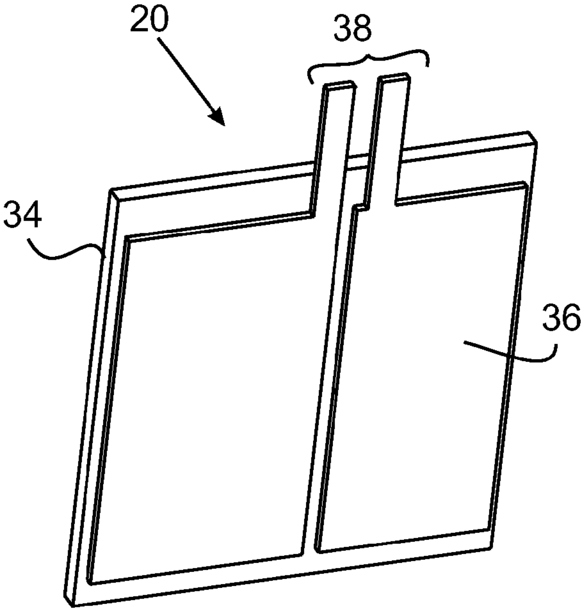
Figure 3B:
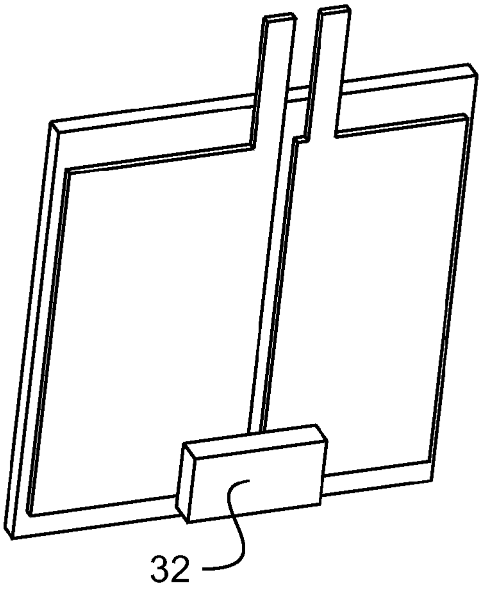
Figure 3C:
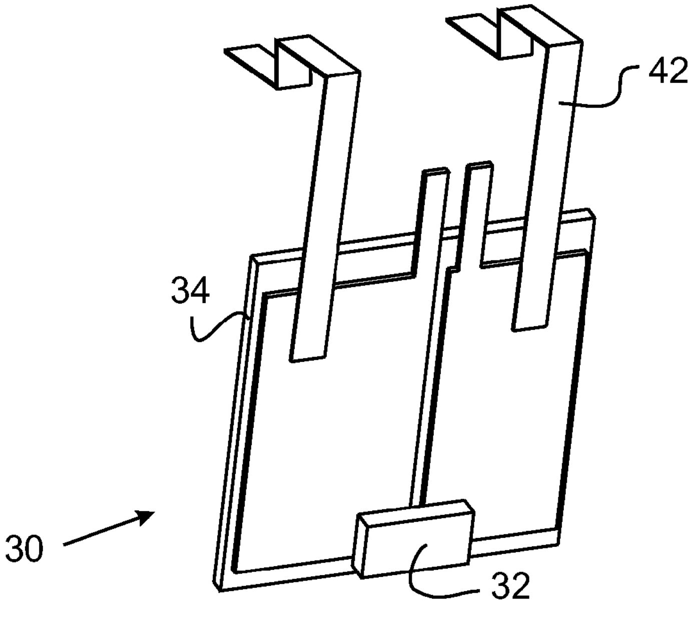

FIG. 1*a* shows an LED lighting element 30 including an LED 32. LED lighting element 30 is more clearly visible in FIG. 3*a*-3*c*, which show the assembly of this element:

A substrate 34 is provided with electrical lead surfaces 36 ending in contact straps 38 (FIG. 3*a*). An LED element 32 is mounted on the contact areas (FIG. 3*b*) and electrically connected. Electrical leads 42 made out of sheet metal, which comprise a 90° bend, are mounted on contacts 38. To overcome problems resulting from mechanical stress due to different coefficients of thermal expansion between the base (aluminum) and the LED, the LED 32 is mounted on a stack with layers of different material.

FIG. 2 shows how the LED lighting element 30 with LED 32 is mounted on base 10. The substrate 34 of the LED lighting element 30 is placed on mounting surface 20 and fastened by gluing, soldering, mechanical screwing, or by using deformation of metal lips/pins. LED lighting element 30 is aligned between alignment pins 22. The ends of the bent leads 42 are connected to electrical contacts 18 of the connector 16 by soldering, melding, gluing, spring-loaded pressure contact, or twisting of contacts.

In this way, LED lighting element 30 is securely and accurately mounted on base 10. LED 32 is in good thermal contact with the base 10, and electrical connection to the connector 16 is ensured.

LED lighting element 30 is mounted on base 10 such that LED 32 is arranged right next to reflection surface 24. A reflective covering 48 is provided on reflection surface 24.

The covering 48 may be a reflective foil which is fastened on the surface of base 28, e.g. by gluing. Alternatively, the reflective properties may be achieved by vapor deposition of a reflective layer on the surface.

As will be explained later, reflection surface 24 is a part of an asymmetrical collimator used to direct the light emitted from LED 32. The reflection surface 24 is a planar surface. It has trapezoid shape with an opposing front edge 50 and parallel back edge 52. Front edge 50 is a straight line. As will become apparent, front edge 50 of reflection surface 24 is used to create a cut-off in the light distribution achieved by the LED module.

Base 10 comprises a number of external mechanical reference elements. As shown in FIG. 2, these include slanted surfaces 44*a*, 44*b* arranged at the front edges of base 10. These surfaces 44*a*, 44*b* are arranged under an angle, in the shown example 45°, to the front plane 13 of the base 10, and serve as mechanical reference elements to ensure exact positioning of the base in a lighting assembly, such as a vehicle headlight.

As a further mechanical reference element there is provided on the front surface 13 of base 10 a groove 46. Groove 46 is arranged to run parallel to the cut-off edge 50 of reflection surface 24.

FIGS. 4, 5 further illustrate the assembly of LED module 1. Into the pre-assembled base 10 with LED lighting element 32 mounted in cavity 11 and electrically connected to connector 16, an insert 60 is inserted. As shown in FIG. 5, insert 60 exactly fits into cavity 11, between side walls 15, so that it is exactly positioned with regard to base 10.

Additionally, it is possible to provide further guiding and positioning elements, such as positioning pins shown in FIG. 12*a*.

The insert 60 is a plastic part made by injection molding. It comprises a collimator section 62 with reflective surfaces. As in the case of reflective surface 24, the reflective surfaces of the collimator may comprise a reflective foil which is applied and glued to the insert 60, or alternatively, a vapor deposited layer with reflective properties.

As insert 60 is received in the base 10, as shown in FIG. 5, the reflective surfaces of its collimator part 62 form, together with the reflective surface 24 of the base, a collimator cup 70. As can be seen in the cross-sectional view of FIG. 6, LED element 32 mounted in the cavity of base 10 is placed in the center of collimator 70 formed by the reflective surface 24 of the base 10, a reflective top surface 64 of the insert 60 arranged in the cavity 11, and reflective side surfaces 66*a*, 66*b*, of which only one is visible in FIG. 6. Collimator 70 is entirely comprised of planar surfaces, where the bottom surface 24 and the side surfaces 66*a*, 66*b* are completely planar and the top surface 64 is divided into two planar sections. The first section of top surface 64 is arranged at an angle of 15° with the reflective surface 24 of the base.

As can be seen in FIG. 6, the straight edge 50 borders the planar reflection surface 24 at the end distant from LED element 32. In the light distribution achieved by collimator 70, the edge 50 provides a sharp light/dark cut-off. FIG. 7 shows as a schematic drawing the approximate, idealized light distribution as a projected image. Here, a clear horizontal cut-off is visible as a straight line 72.

It should be clear that the exact configuration of the collimator 70, which is entirely comprised of planar surfaces, while it is the preferred embodiment, may alternatively comprise differently shaped, e.g. curved surfaces. However, it is essential, that a light distribution with a sharp light/dark cut-off is achieved by the edge 50.

In order to achieve a desired light distribution with a sharp cut-off for automotive lighting, a plurality of LED modules 1 may be arranged, such that their light distributions overlap. One or more of these LED modules would than be arranged at an angle of 15°, so as to achieve the prescribed light distribution for automotive front lighting, as shown in FIG. 8.

Figure 9A:
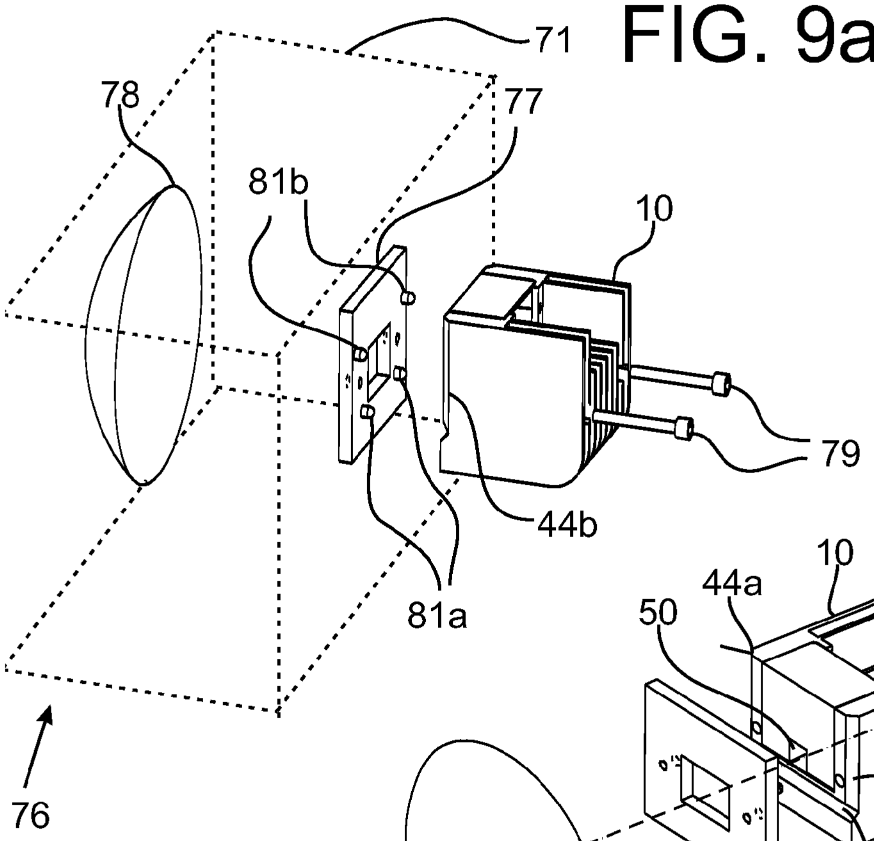

As is easily visible, it is crucial for the overlapping light distribution shown in FIG. 8 that all LED modules 1 are positioned exactly, so that the light/dark cut-off line 72 is at an established position. As shown in FIG. 9*a*, the complete module 1 is received in a part of a vehicle headlamp 76 (only shown in part). Here, the mechanical reference elements surfaces 44*a*, 44*b* as well as groove 46 serve to exactly position the module. Groove 46 is arranged exactly parallel to the cut-off edge 50. Due to the fact, that groove 46 as well as cut-off edge 50 are both part of the base 10, their relative positioning is exactly known, so that high accuracy is achieved without further adjustment.

Mounting of the module 10 in a vehicle head lamp is illustrated in FIGS. 9*a*, 9*b*-11*a*, 11*b*. Here, a window-shaped mounting plate 77 and a lens 78 of a vehicle headlight are shown. The mounting plate 77 is part of the vehicle head lamp housing 71 (only shown symbolically in dashed lines) or fixed thereto. Because the mounting plate 77 is integral part of the vehicle head lamp 76, its positioning relative to the optical axis of the lens 78 is quite exact.

Figure 9B:
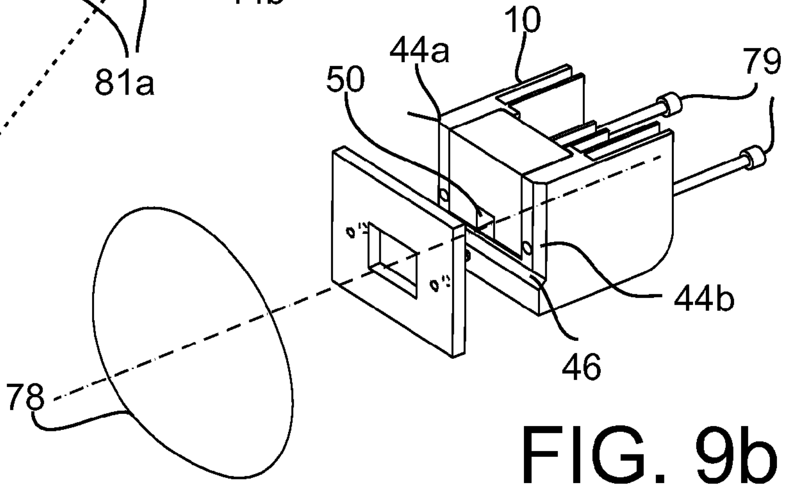
Figure 10A:
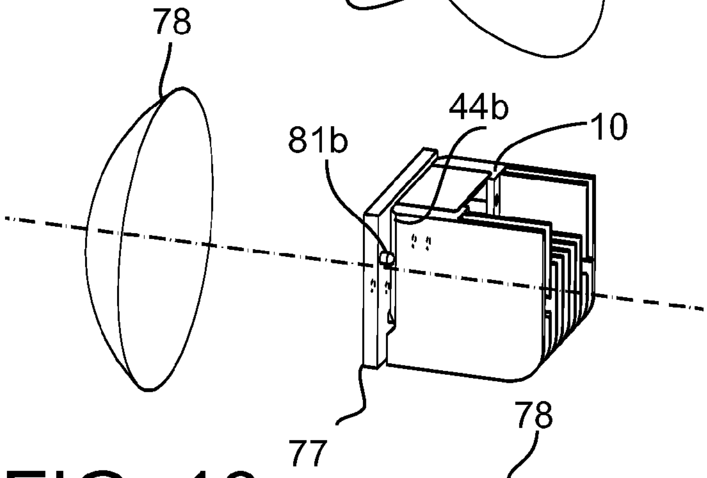
Figure 10B:
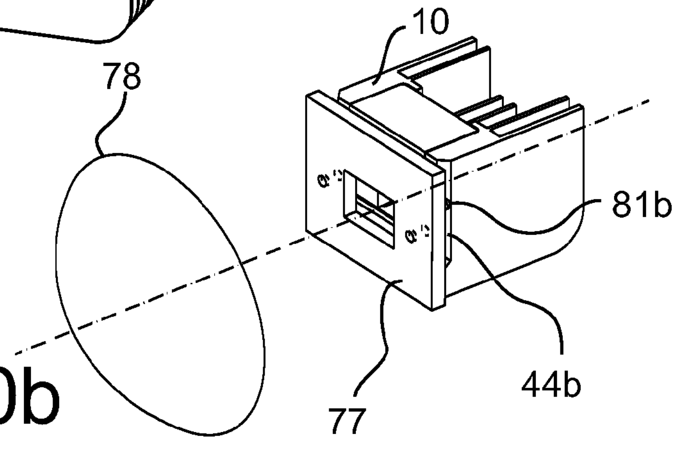

FIG. 9*a*, 9*b* show an exploded view of the mounting plate 77 and the module 10 prior to mounting of the module. The module 10 is pressed to the window-shaped mounting plate 77 and fixed thereto by screws 79. The mounting plate 77 comprises on its outer surface first positioning pins 81*a* and second positioning pins 81*b*. These positioning pins 81*a*, 81*b* serve to exactly position the module 10 when mounted on mounting plate 77.

Figure 11A:
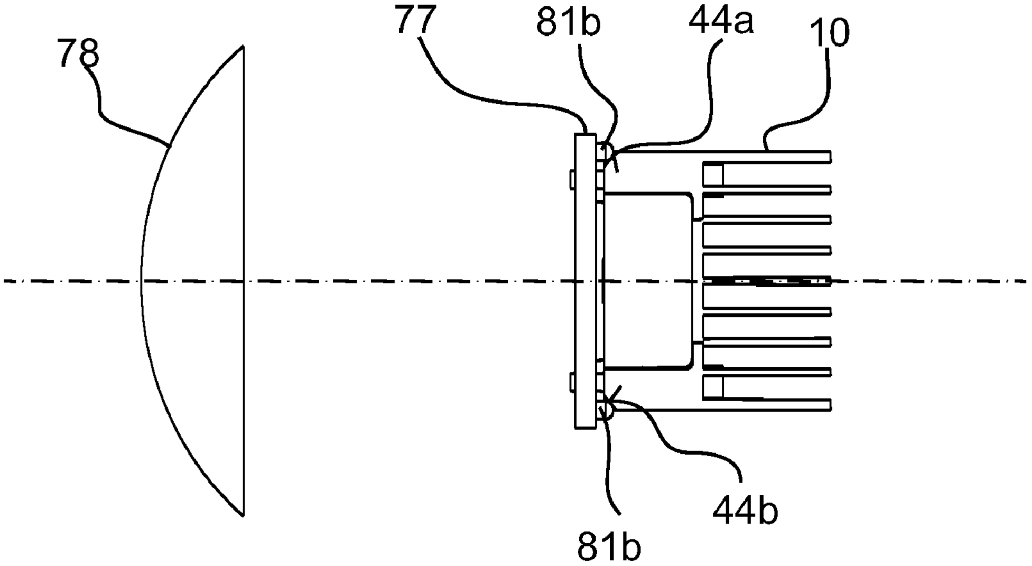
Figure 11B:
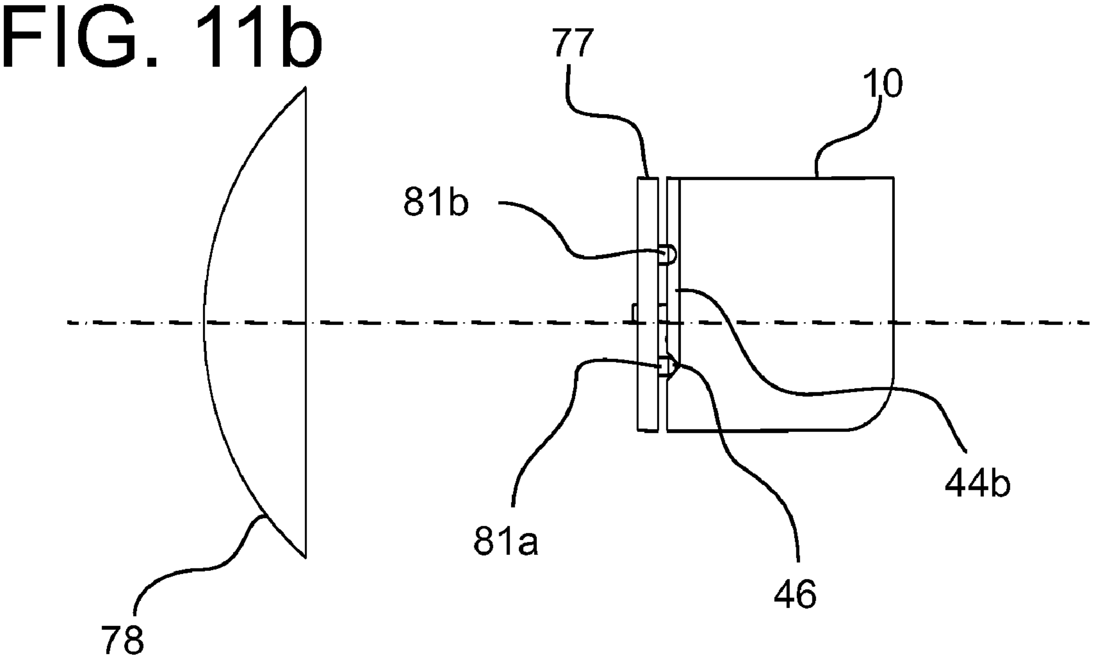

As visible in FIG. 11*b*, first positioning pins 81*a* of the mounting plate 77 engage the groove 46 of the module 10. Thus, exact positioning with regard to rotation about the optical axis is ensured.

At the same time, second positioning pins 81*b* engage slanted reference surfaces 44*a*, 44*b*. As module 10 is urged towards the mounting plate 77 by screws 79, engagement between second reference pins 81*b* and reference surfaces 44*a*, 44*b* serve to center the module 10 and to achieve accurate positioning in the horizontal direction.

Next, with reference to FIGS. 12*a*-15, a second embodiment of the invention will be described. The construction of an LED module 1 according to the second embodiment in large parts corresponds to the above described first embodiment, so that parts already described will not be once again described in detail. Rather, only differences between the first and second embodiment will be explained.

In the second embodiment, contacts 80 are molded into the insert 60' and the plug 16 is integrally formed by the insert 60'. The insert 60' of the second embodiment also comprises a collimator part 62 with reflective surfaces. Within the injection-molded plastic body of the insert 60', sheet metal webs 80 (in FIG. 12*a* only visible as contacts 17 of plug 16) are embedded as electrical contacts. The forming of contacts by molding in electrical connectors is per se known as MID (molded interconnection devices) technology.

As shown in the figures, the insert 60' comprising the plug 16 is received in the base 10. Positioning pins 84 engage positioning holes 88 in the surface 24, so that exact positioning of the collimator cup 70 with regard to the LED 32 is ensured.

The LED lighting element 30 mounted on base 10 comprises contact surfaces. Provided on the inside of the insert 60' are contact pins 86, which are electrically connected with the embedded sheet metal webs, and therefore connected to the contacts 17 of plug 16. When insert 60' is mounted in base 10 (FIG. 13) and if finally received in cavity 11 of base 10, contact pins 86 are pressed onto the contact surfaces of the LED lighting element 30, so that electrical contact is ensured. In this way, the LED lighting element comprising the LED 32 is electrically connected to the contacts 17 of the plug 16.

The lighting device (LED module) according to the second embodiment has an exceptionally low part count, comprising only the base 10, the lighting element 30 and the insert 60'. Mounting is extremely easy, yet at the same time very accurate.

According to one embodiment, the contact pins 86 of the insert 60' are directly connected to the sheet metal webs 80, and thereby to the contact of plug 16. This is shown in the cross sectional view of FIG. 15*a*. In this case, the molded-in contacts 80 run directly from the plug 16 to the contact pins 86, without any further electrical function.

Figure 15B:
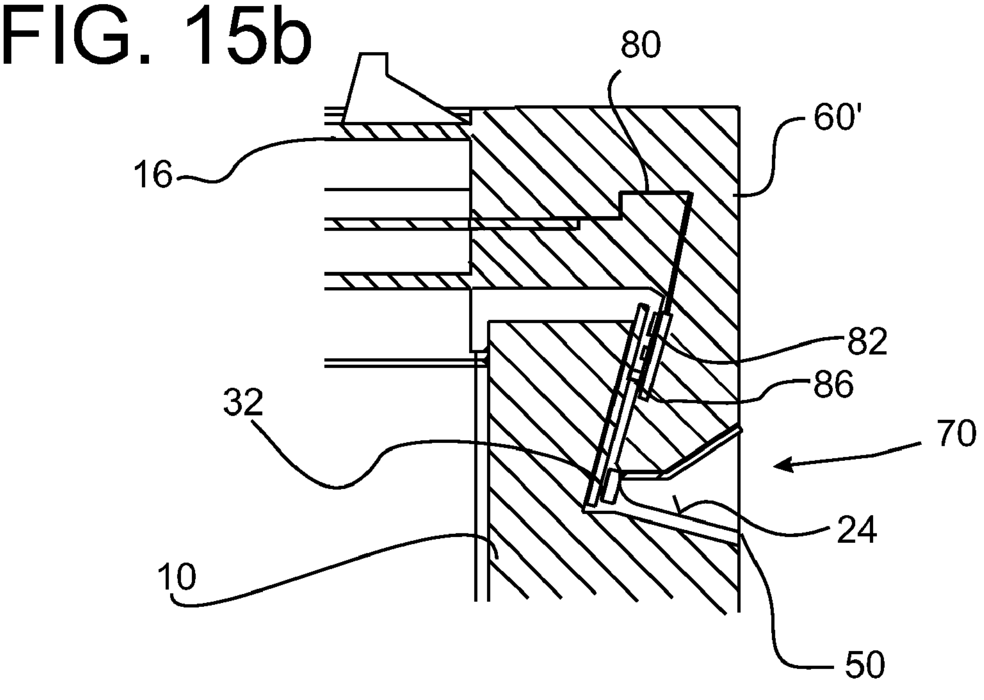

Alternatively, as shown in FIG. 15*b*; the insert 60' may comprise further electrical parts 82, as shown in FIG. 12*a*. In this case, the molded-in contact do not directly connect the contact pins 86 to the plug 16. Instead, an electrical circuit comprised of the parts 82 is connected to the plug 16, and contact pins 86 leading to LED 32 are also connected to the electrical circuit. The electrical circuit, which may comprise one or more integrated electrical circuit and/or discreet parts may perform a plurality of electrical functions, and preferably operate as a driver circuit for LED 32. In this case, for operating the LED 32, only a suitable operating voltage needs to be applied to the driver circuit 82 via contacts 80, so that the driver circuit 82 in turn operates the LED 32.

As also shown in the cross sectional views of FIG. 15*a*, 15*b*, the connector 16 may be molded integrally with insert 60' (FIG. 15*b*), or may alternatively be a separate plastic part (FIG. 15*a*).

While preferred embodiments have been described above, there are further modifications possible:

It is possible to use the base 10 as an electrical contact. Thus, supply of electrical power to the LED element could be, at least in part, achieved by conduction through (at least a part of) the base. This could serve to further simply the construction, because less separate electrical leads from plug 16 to LED elements 32 are required.

In the embodiments shown above, the collimator 70 in each case comprises a cavity where the LED element 32 is mounted. It is possible to fill this cavity fully or in part by a transparent material. Also, it is possible to close the cavity by an optical glass.

In summary, embodiments of a lighting device have been explained which have low part count and are easy to manufacture. Yet, they serve to provide a well-defined mechanical, electrical, optical and thermal interface for the LED 32. Already in the first embodiment, only three parts (base 10 with connector 16, LED lighting element 30 and insert 60) need to be assembled. In the second embodiment, this is even further reduced so that only two parts (base and insert) need to be assembled. Still, the lighting device ensures a strong light/dark cut-off with high accuracy.

The invention claimed is:

1. A vehicle headlight device, comprising:

a base comprising a heat conducting material and mountable against a vehicle headlight housing;

an LED lighting element mounted to said base at a downward angle relative to said headlight housing; and a collimator reflector arranged to direct light emitted from said LED lighting element said collimator reflector having a bottom reflector surface with a first straight border line, a first and second side reflective surface and a top reflective surface, said bottom reflector surface at a downward angle relative to said top reflective surface, said side, bottom and top reflective surface forming a trapezoidal collimator cup, where said collimator cup is arranged to reflect light from said LED lighting element such that a cut-off is formed by said border line of said bottom reflector surface.

2. The vehicle headlight device according to claim 1, wherein said bottom reflector surface is a planar surface comprising said first straight border line and an opposite second border line, and wherein said second border line is arranged closer to said LED lighting element.

3. The vehicle headlight device according to claim 1, wherein said base includes a plurality of mechanical reference elements provided in predetermined relation to said border line to fixedly position the vehicle headlight relative to said vehicle headlight housing.

4. The vehicle headlight device according to claim 3, wherein said mechanical reference elements comprise at least one of a groove, a web, a plurality of cavities, or a plurality of elevations, at least one of said elements being arranged in a line in parallel to said first border line.

5. The vehicle headlight device according to claim 1, wherein said base comprises a cavity, and said LED lighting element is mounted in said cavity, and wherein an insert is at least partly received in said cavity, said side reflector surfaces and said top reflective surface being a surface of said insert.

6. The vehicle headlight device according to claim 5 wherein said insert is made of plastic material, electrical contacts are molded into the plastic material, and electrically connected to said LED lighting element.

7. The vehicle headlight device according to claim 6, wherein said lighting device further comprises an electrical connector, and wherein said electrical contacts molded into said insert are electrically connected to said electrical connector.

8. The vehicle headlight device of claim 3, said headlight further comprising a vehicle headlight body comprising at least one headlight reference element engaging at least one of said mechanical reference elements of said lighting device.

9. A vehicle headlight device, comprising:

a heat sink base with a downwardly angled mounting surface having an LED mounted at said downward angle;

a collimator cup forming a cut off light output of said LED, said collimator cup formed by a bottom, top and a first and second side surface, said bottom surface at a downward angle relative to said top surface of greater than about 15°, said top surface substantially perpendicular to a vertical axis of said base;

wherein each of said bottom, top and two side surfaces are reflective;

said bottom reflective surface having an outer edge acting as a cutoff obstruction to said LED;

said base having at least one mechanical mounting surfaces mountable against a mounting plate of a vehicle headlight housing.

10. A vehicle headlight device, comprising a heat sink base made out of a heat conducting material and mountable against a vehicle headlight housing;

an LED lighting element mounted to said base at a downward angle relative to said headlight housing;

a collimator cup arranged to direct light emitted from said LED lighting element, said collimator cup having a bottom reflector surface with a straight border line, a first and second side reflective surface and a top reflective surface, said bottom reflector surface at a downward angle relative to said top reflective surface;

said collimator cup being a trapezoidal collimator cup;

wherein said side and top reflective surfaces forming said collimator cup are a surface of an insert received on said base, wherein said collimator cup is arranged to reflect light from said LED lighting element such that a cut-off illumination pattern is formed by an outer edge line of said bottom reflector surface.

* * * * *